US 11,316,388 B2

(12) United States Patent
Higashiyama et al.

(10) Patent No.: US 11,316,388 B2
(45) Date of Patent: Apr. 26, 2022

(54) STATOR, METHOD OF MANUFACTURING STATOR, AND OUTER ROTOR TYPE MOTOR (71) Applicant: SHINANO KENSHI KABUSHIKI KAISHA, Nagano (JP)

(72) Inventors: Keita Higashiyama, Nagano (JP); Masayoshi Hoshino, Nagano (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 83 days.

(21) Appl. No.: 15/931,229

(22) Filed: May 13, 2020

(65) Prior Publication Data
US 2020/0403460 A1 Dec. 24, 2020

(30) Foreign Application Priority Data
Jun. 24, 2019 (JP) .............................. JP2019-116160

(51) Int. Cl.
H02K 1/14 (2006.01)
H02K 21/22 (2006.01)
H02K 15/02 (2006.01)
H02K 1/27 (2006.01)
H02K 1/2786 (2022.01)

(52) U.S. Cl.
CPC ............. H02K 1/146 (2013.01); H02K 1/148 (2013.01); H02K 1/2786 (2013.01); H02K 15/022 (2013.01); H02K 21/22 (2013.01)

(58) Field of Classification Search
CPC ...... H02K 1/146; H02K 21/22; H02K 15/022; H02K 1/2786; H02K 15/095; H02K 1/148
See application file for complete search history.

(56) References Cited

U.S. PATENT DOCUMENTS

| 5,986,377 A | 11/1999 | Yamada et al. |
| 2002/0050541 A1 | 5/2002 | Akita et al. |
| 2003/0098628 A1* | 5/2003 | Enomoto ............. H02K 15/022 |
| | | 310/216.057 |
| 2013/0249327 A1* | 9/2013 | Gianni ................... H02K 1/187 |
| | | 310/43 |

FOREIGN PATENT DOCUMENTS

| CN | 103762757 | 4/2014 |
| JP | 2000324772 | 11/2000 |
| JP | 2002-142417 | 5/2002 |
| JP | 2007-20251 | 1/2007 |
| JP | 2010-119163 | 5/2010 |
| JP | 2012-170253 | 9/2012 |
| JP | 5356897 | 12/2013 |
| JP | 2014-79059 | 5/2014 |
| WO | WO-2014/24988 | 8/2013 |

OTHER PUBLICATIONS

Japanese Office Action dated Feb. 2, 2021 in Japanese Application No. 2019-116160.
German Office Action dated Mar. 19, 2021 in German Application No. 10 2020 207 735.5.

* cited by examiner

Primary Examiner — Tulsidas G Patel
Assistant Examiner — Riley Owen Stout
(74) Attorney, Agent, or Firm — Stephen J. Weyer, Esq.; Stites & Harbison, PLLC (57) ABSTRACT Groove holes capable of positioning each of the segment cores with respect to a winding jig in an arc attitude with wide gaps between the teeth edges of respective pole teeth are respectively formed in yoke parts positioned at both end parts of each of the segment cores in a longitudinal direction.

8 Claims, 12 Drawing Sheets

STATOR, METHOD OF MANUFACTURING STATOR, AND OUTER ROTOR TYPE MOTOR

CROSS-REFERENCE TO RELATED APPLICATION

This application is based upon and claims the benefit of priority of the prior Japanese Patent Application No. 2019-116160, filed on Jun. 24, 2019, and the entire contents of which are incorporated herein by reference.

TECHNICAL FIELD

The present invention relates to a stator, a method of manufacturing the stator, and an outer rotor type motor.

BACKGROUND ART

For example, in a structure in which many slots are provided in a stator core of an outer rotor type motor, gaps between teeth edges of pole teeth provided to extend on an outer side in a radial direction from annular core members are narrow, which makes it difficult to wind bold wire as a coil, and when a nozzle of a winding machine is not capable of entering, it is impossible to perform automatic winding. Furthermore, a space for the nozzle of the winding machine entering between teeth edges of the pole teeth is necessary, so that a space factor of the coil is reduced and winding the coil at high density is difficult, and therefore, manual winding work has to be selected.

In order to facilitate the winding work of the stator and to increase efficiency of the winding work, a development-type core members in which a plurality of yoke parts are connected through thin wall parts are used, the core members are formed in an arc shape from a straight line state so that magnetic pole teeth parts face outward in the radial direction, and the core members are positioned in a columnar holding jig to be held. There is disclosed a method of manufacturing the stator including the steps of winding the coil around respective magnetic pole teeth by using a flyer-type nozzle of the winding machine, removing the core members from the holding jig, bending the core members so that the magnetic pole teeth parts face inward in the radial direction to be formed in a ring shape, and fixing both ends by welding (refer to PTL 1: JP-A-2000-324772).

SUMMARY OF INVENTION

Technical Problem

In the above method of manufacturing the stator disclosed in PTL 1, positioning is not performed at the time of forming the core members in the arc shape from the straight line state so that the magnetic pole teeth parts face outward. The core members are formed by concavo-convex fitted to the holding jig at the time of being attached to the holding jig and by pressing the both ends of the core members by using a cylinder, then, the core members are fixed to the holding jig by pressing the yoke members in an axial direction using spring members. After the coil is wound by the winding machine, the core members are bent so that the magnetic pole teeth parts face inward in the radial direction to be formed in the annular shape, then, the both ends are fixed by welding. Accordingly, the thin wall parts of the core members are bent so that the magnetic pole teeth parts face outward in the radial direction in plural processes and are finally bent so that the magnetic pole teeth parts face inward in the radial direction; therefore, there are many processes in which the core members are bent at the thin wall parts, which increases man-hours and tends to cause deformation and positional displacement as positioning of ends of the core members is not performed at the time of bending, as a result, roundness of the stator core in a final state tends to be lost. In particular, the thin wall parts of the core members are bent so that the magnetic pole teeth parts face outward in the radial direction and finally bent so that the magnetic pole teeth parts face inward in the radial direction; therefore, extension or deformation in the thin wall parts tends to occur and roundness as the stator core tends to be lost.

Solution to Problem

In response to the above issue, one or more aspects of the present invention is directed to a stator, a method of manufacturing the stator capable of performing automatic winding with a high space factor by a winding machine with respect to a stator core with narrow gaps between teeth edges of pole teeth, in which segment cores are respectively assembled in an annular shape while maintaining roundness, and an outer rotor type motor with productivity improved by using the stator.

In view of the above, the following embodiments are described below.

There is provided a stator configured by segment cores obtained by dividing an annular stator core in which yoke parts provided with pole teeth are connected to one another through thin wall parts into plural segments being assembled in an annular shape, in which groove holes capable of positioning each of the segment cores with respect to a jig in an arc attitude are respectively formed in the yoke parts positioned at both end parts of each of the divided segment cores in a longitudinal direction.

When each of the segment cores is positioned with respect to the jig in the arc attitude with large gaps between teeth edges of respective pole teeth by using groove holes provided in the yoke parts positioned at both end parts of the segment core in the longitudinal direction, automatic winging can be stably performed with the high space factor using the winding machine while securing sufficient spaces between slots. Moreover, when the plural segment cores in which the coil is wound are expanded and fastened in the annular shape, the segment cores are positioned in the jig by using the groove holes and fastened in the annular shape, thereby assembling the stator core with high roundness.

It is preferable that a concave part and a convex part for fastening the segment cores to one another in the annular shape are provided at ends of the yoke part positioned at both end parts of each of the segment cores in the longitudinal direction.

Accordingly, when the segment cores in which the coil is wound are expanded and assembled in the annular shape, the annular stator core can be assembled while maintaining roundness by concavo-concave fitting the ends of respective segment cores in the state where the groove holes provided in the yoke parts positioned at both end parts of the segment core in the longitudinal direction are positioned in the jig.

It is preferable that the concave part is formed in a dovetail groove shape, inclination angles of groove side walls with respect to a groove bottom part are formed so that the inner diameter side is equal to or greater than the outer diameter side, and inclination angles of both side surfaces with respect to an end surface of the convex part to be fitted to the concave part are formed so that the inner diameter side is equal to or greater than the outer diameter side.

Accordingly, when the segment cores are connected to one another in the annular shape by fitting the convex part to the concave part, connection can be performed without generating a clearance in a radial direction and a circumferential direction due to degrees of inclination in the both side surfaces of the convex part and the groove side walls of the concave part.

It is preferable that the groove hole is formed on a surface where a center line in a longitudinal direction of the pole tooth extended from the yoke part crosses the yoke part.

When the groove holes are formed on the surface where the center line in the longitudinal direction of the pole tooth crosses the yoke part in the yoke parts positioned at both end parts of the segment core in the longitudinal direction, the groove holes can be formed without affecting the yoke parts to be magnetic passages.

It is preferable that the groove hole is a round groove hole to which a columnar positioning pin is capable of being fitted.

If the positioning pins have a prismatic shape, roundness formed by respective yoke parts tends to be lost due to a deformation state of the yoke parts when the positioning pins are fitted to the groove holes; however, roundness is easily formed by respective yoke parts connected in an arc shape when the positioning pins are fitted to the groove holes in the case of the round hole which is free from directivity.

In an outer rotor type motor including a stator according to any of the above, it is possible to provide an outer rotor type motor with the high space factor and good productivity.

A method of manufacturing a stator includes the step of preparing a plurality of arc-shaped segment cores in which yoke parts provided with pole teeth are connected to one another through thin wall parts and peripheries of the pole teeth are covered with insulated bobbins, the step of positioning each of the segment cores with respect to a winding jig in an arc attitude having a larger curvature than that of a stator core with larger gaps between teeth edges of respective pole teeth by fitting positioning pins provided in the winging jig to groove holes provided in the yoke parts positioned at both end parts of each of the segment cores in a longitudinal direction, the step of winding a coil around the pole teeth extended in a radial direction of each of the segment cores positioned in the winding jig through the insulated bobbins by using a winding machine, and the step of expanding the segment cores in which the coil is wound to be positioned in an annular fastening jig, and fastening the segment cores to one another in an annular shape by fitting a concave part and a convex part provided at ends of the yoke parts positioned at both end parts of each segment core in the longitudinal direction.

When using the method of manufacturing the stator, for example, the positioning pins provided in the winding jig are fitted to the groove holes provided in the yoke parts positioned at both end parts of the arc-shaped segment core in the longitudinal direction; thereby winding the coil by the winding machine through insulated bobbins in the state where the segment core is positioned stably with respect to the winding jig in the arc attitude in which respective yoke parts connected through the thin wall parts have the larger curvature than that of the stator core with larger gaps between the teeth edges of respective pole teeth, as a result, coil winding work can be performed with the high space factor while saving labor.

Moreover, the segment cores in which the coil is wound are expanded so as to reduce the curvature and positioned in the annular fastening jig by using the groove holes, and the concave part and the convex part provided at ends of the yoke parts positioned at both end parts in the longitudinal direction are fitted to each other to fasten respective segment cores in the annular shape, thereby assembling the stator while maintaining roundness of the stator core.

It is preferable that the groove holes at both end parts in the longitudinal direction of the segment cores in which the coil is wound are fitted in positioning ridges provided in segment jigs corresponding to an inner diameter of a stator core to prevent rotation and the plural segment jigs positioned in a radial direction are combined with one another in the annular shape and ends of respective segment cores are concavo-convex fitted to both sides of the segment cores to be fastened in the annular shape.

According to the above, the segment cores in which the coil is wound are positioned by fitting the groove holes in the positioning ridges in the segment jigs corresponding to the inner diameter of the stator core, the plural segment jigs are combined to one another in the annular shape and ends of the segment cores are concavo-convex fitted to one another to be fastened in the annular shape, thereby assembling the annular stator core while maintaining roundness.

Advantageous Effects of Invention

It is possible to provide a stator in which automatic winding can be performed with the high space factor by the winding machine with respect to the stator core with narrow gaps between teeth edges of pole teeth and the segment cores are assembled in the annular shape while maintaining roundness, and the method of manufacturing the stator with improved productivity. It is also possible to provide an outer rotor type motor with the high space factor and improved productivity by using the above stator.

DESCRIPTION OF EMBODIMENTS

Hereinafter, a stator, a method of manufacturing the stator, and an outer rotor type motor according to the present invention will be explained with reference to the attached drawings. First, an outline structure of the outer rotor type motor will be explained with reference to FIG. 1. A DC brushless motor is used as the outer rotor type motor in the embodiment.

Figure 1:
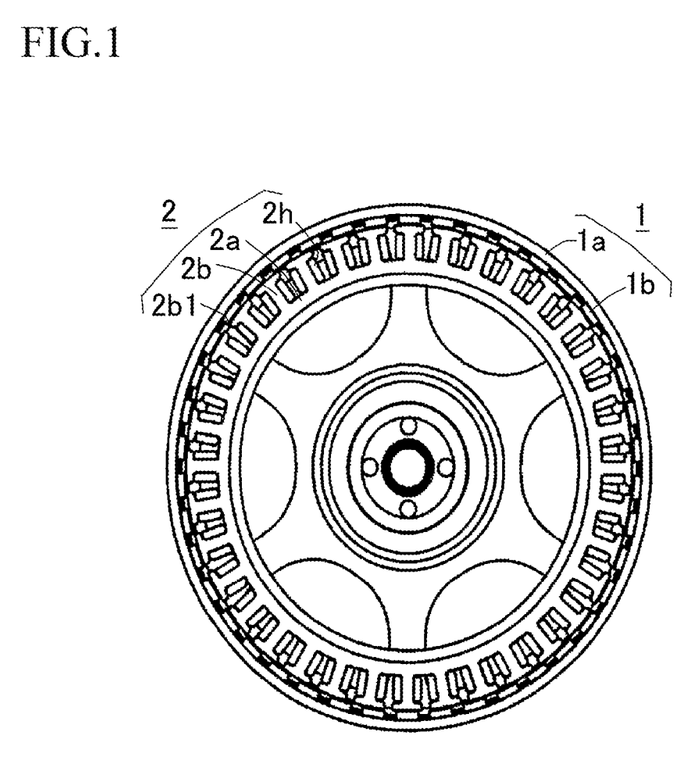
FIG. 1 is a cross sectional view showing an example of an outer rotor type motor.

As shown in FIG. 1, an outer rotor type motor including a rotor 1 and a stator 2 is used for the DC brushless motor. The rotor 1 is configured so that annular rotor magnets 1b in which N-poles and S-poles are alternately magnetized in a circumferential direction are supported on an inner peripheral surface of an annular back yoke 1a (a magnetic material such as iron and SUS) connected to a rotor shaft. The rotor magnets 1b are arranged so as to face pole teeth 2b of a stator core 2c.

The stator 2 adopts the stator core 2c in which the pole teeth 2b are provided to protrude on annular yoke parts 2a so as to face outward in a radial direction. The stator core 2c may be either a laminated core in which electromagnetic steel plates are laminated and pressed or a block core made of a magnetic metal block. The stator core 2c is coated with an insulator (insulated bobbins 3: see FIG. 4) around the pole teeth 2b, and a coil 2h is respectively wound around the insulated bobbins 3.

Figure 2A:
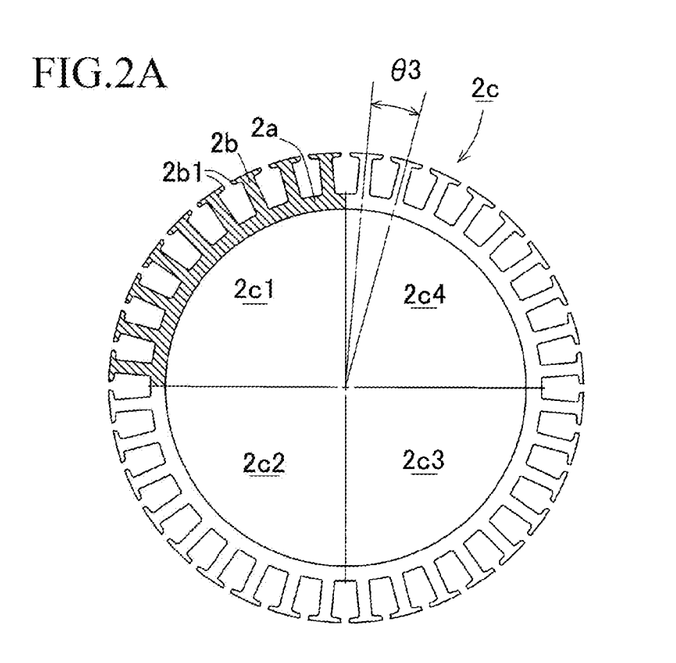
FIG. 2A is a schematic view of a stator core.

As shown in FIG. 2A, many pole teeth 2b are formed from the yoke parts 2a in the stator core 2c; therefore, gaps between teeth edges 2b1 of the pole teeth 2b are narrow and a nozzle is not capable of entering in a case of a nozzle-type winding machine, which makes it difficult to automatically wind the coil 2h. Accordingly, the stator core 2c used in the present embodiment applies segment cores 2c1 to 2c4 formed by dividing the stator core 2c into plural segments.

As shown in FIG. 2A, the segment cores 2c1 to 2c4 formed by dividing the annular stator core 2c, for example, into four by 90 degrees in a circumferential direction are used. In each of the segment cores 2c1 to 2c4, the yoke parts 2a on which the pole teeth 2b are formed are respectively connected through thin wall parts 2d. As the number of the pole teeth 2b is large and gaps between the teeth edges 2b1 are narrow in a state of the stator core 2c shown in FIG. 2A, there is no clearance into which the nozzle of the winding machine enters and it is difficult to perform winding with a high space factor (high winding density).

Figure 2B:
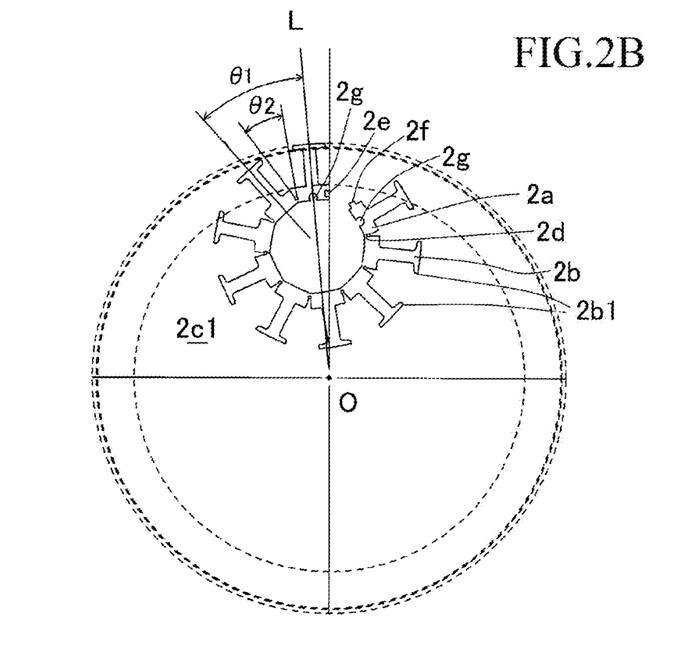
FIG. 2B is an explanatory view for a segment core obtained by dividing the stator core.

In response to the above, the stator core 2c is divided into the segment cores 2c1 to 2c4, and each segment core is fabricated in an arc shape with wide gaps between teeth edges of pole teeth to thereby perform automatic winding using the winding machine. As shown in FIG. 2B, the electromagnetic steel plates are punched so that the yoke parts 2a form the arc shape with the pole teeth 2b facing outward in the radial direction through the thin wall parts 2d in the segment core 2c1, which makes gaps between the pole teeth 2b wide and coil winding with a high space factor can be performed by the winding machine. When an angle made by the pole teeth 2b of the stator core 2c in FIG. 2A is θ3 and an angle made by the pole teeth 2b of the segment core 2c1 in FIG. 2B is θ1, the segment core 2c1 is fabricated in an arc shape so as to have a larger curvature than that of the stator core 2c (θ1>θ3). At this time, the angle θ1 (for example, 37 degrees) made by the pole teeth 2b of the segment core 2c1 is larger than an opening angle θ2 (for example, 27 degrees) of the thin wall part 2d (θ1>θ2) as shown in FIG. 2B. In the case that the segment core 2c1 is fabricated in the arc shape, it is preferable that a deformation amount is reduced as small as possible in consideration of loads (extension, deformation and so on) in the thin wall parts 2d.

As shown in FIG. 2B, a concave part 2e or a convex part 2f for connecting adjacent segment cores to each other are provided at ends of the yoke parts 2a positioned at both end parts of each of the segment cores 2c1 to 2c4 in a longitudinal direction. The concave part 2e is formed in a dovetail groove shape, which is formed so as not to be pushed in or pulled out in the circumferential direction.

Figure 2C:
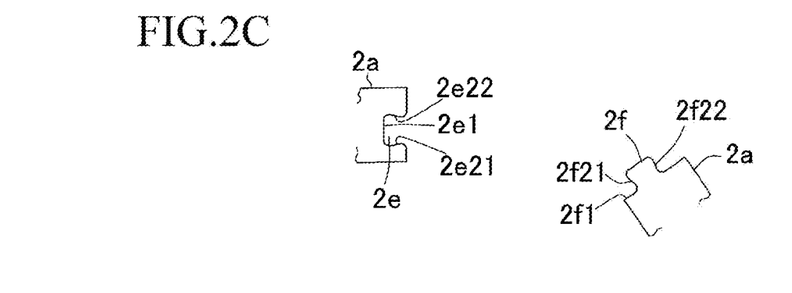
FIG. 2C is a schematic explanatory view showing states of yoke ends of the segment core.

As shown in FIG. 2C, the concave part 2e is formed in the dovetail groove shape, and inclination angles of groove side walls 2e21 and 2e22 with respect to a groove bottom part 2e1 are formed so that the inner diameter side (2e21) is equal to or greater than (equal to or larger than) the outer diameter side (2e22). Inclination angles of both side surfaces 2f21 and 2f22 with respect to an end surface 2f1 of the convex part 2f to be fitted to the concave part 2e are formed so that the inner diameter side (2f21) is equal to or greater than the outer diameter side (2f22). When the convex part 2f is connected to the concave part 2e, respective parts are positioned in a motor shaft direction (a thickness direction of the stator core 2c) and fitted to each other.

Accordingly, when the segment cores 2c1 to 2c4 are fastened in an annular shape by fitting the convex part 2f to the concave part 2e, connection can be performed so as not to generate a clearance in the radial direction and the circumferential direction due to degrees of inclination in the both side surfaces 2f21 and 2f22 of the convex part 2f and the both groove side walls 2e21 and 2e22 of the concave part 2e.

Moreover, the yoke parts 2a positioned at both end parts of each of the segment cores 2c1 to 2c4 in the longitudinal direction are respectively provided with groove holes 2g for positioning each of the segment cores 2c1 to 2c4 with respect to a winding jig 4 in an arc attitude with wide gaps between the teeth edges 2b1 of respective pole teeth 2b while the pole teeth 2b are extended outward in the radial direction by deforming each of the segment cores 2c1 to 2c4 at the thin wall parts 2d through which the yoke parts 2a are connected in FIG. 2B. The concave part 2e, the convex part 2f, and the groove holes 2g are formed at the time of punching the electromagnetic steel plates in the laminated core, and formed at the time of processing such as electric discharge machining or metal forming in the block core.

The groove hole 2g is formed so as to open outward on an inner peripheral surface where a center line L of the pole tooth 2b extended from the yoke part 2a in the longitudinal direction crosses the yoke part 2a as shown in FIG. 2B. Accordingly, the groove holes 2g can be provided without affecting the yoke parts 2a to be magnetic passages. The reason that the groove holes opening to the inner diameter side are formed, not forming through holes, is for giving general versatility and for positioning each of the segment cores 2c1 to 2c4 by fitting positioning pins 4c of the winding jig 4 or positioning ridges 5d3 of an annular fastening jig 5 to the groove holes as described later.

Figure 3:
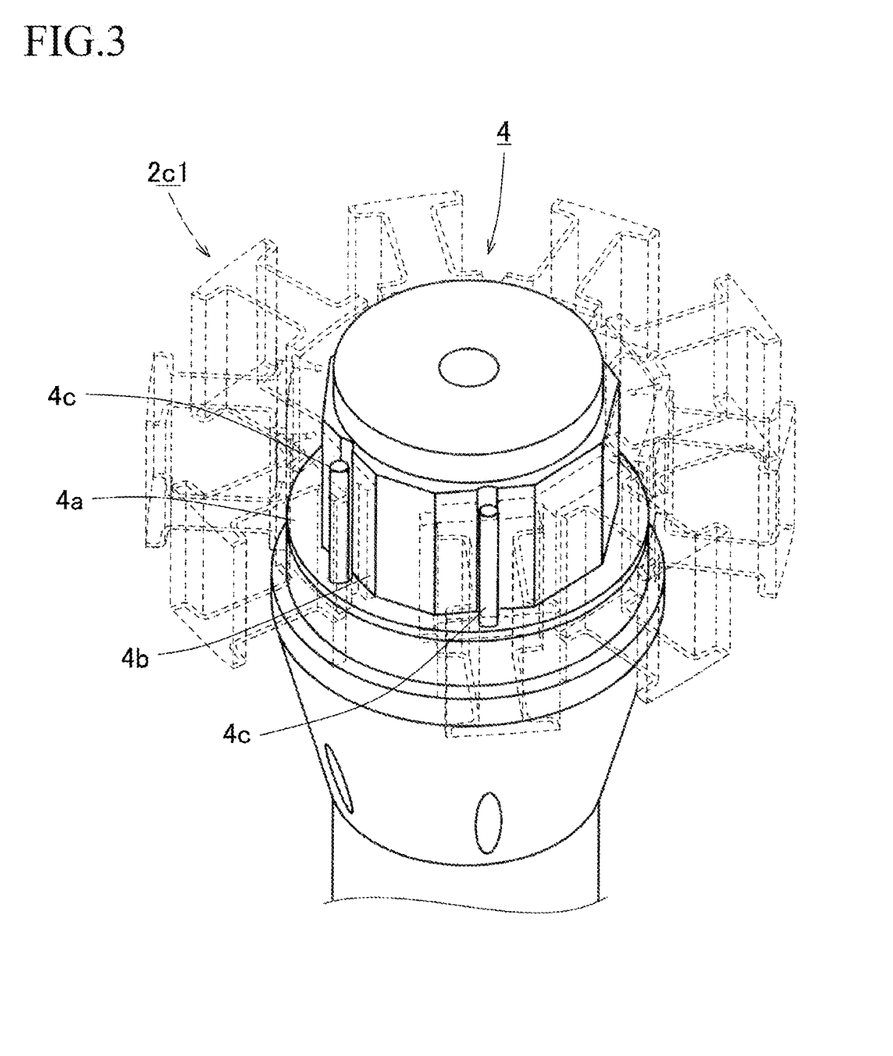
FIG. 3 is a perspective explanatory view for a winding jig.

Various shapes may be adopted as the shape of the groove holes 2g, and round groove holes fitted in the columnar positioning pins 4c provided in the winding jig 4 are preferable as shown in FIG. 3. In a case of a square groove, roundness formed by the yoke parts 2a tends to be lost due to a deformation state of the yoke parts 2a when the positioning pins 4c are fitted to the groove holes 2g; whereas in a case of the round groove which is free from directivity, roundness is easily formed by respective yoke parts 2a by fitting the positioning pins 4c to the groove holes 2g.

As shown in FIG. 3, the winding jig 4 prevents rotation of each of the segment cores 2c1 to 2c4 and perform positioning and fixing of each of the segment cores 2c1 to 2c4 in the arc attitude in which the gaps between the teeth edges 2b1 of respective pole teeth 2b extended outward in the radial direction are widened, and the yoke parts 2a connected through the thin wall parts 2d have a larger curvature than that of the stator core 2c, thereby placing each of the segment cores 2c1 to 2c4 stably. The winding jig 4 includes a stepped part 4a receiving end surfaces of the yoke parts 2a of the segment core 2c1 formed in the arc shape with the larger curvature than that of the stator core 2c and a chamfered guide surface 4b that guides the segment core 2c1 by overlaying the segment core 2c1 so that a surface (inner surface of the arc shape) opposite to a surface (outer surface of the arc shape) on which the pole teeth 2b of the yoke parts 2a are formed faces inward. A pair of the positioning pins 4c fitted to the groove holes 2g provided in the yoke parts 2a positioned at both end parts of each of the segment cores 2c1 to 2c4 in the longitudinal direction are provided to protrude on the stepped part 4a.

Figure 4:
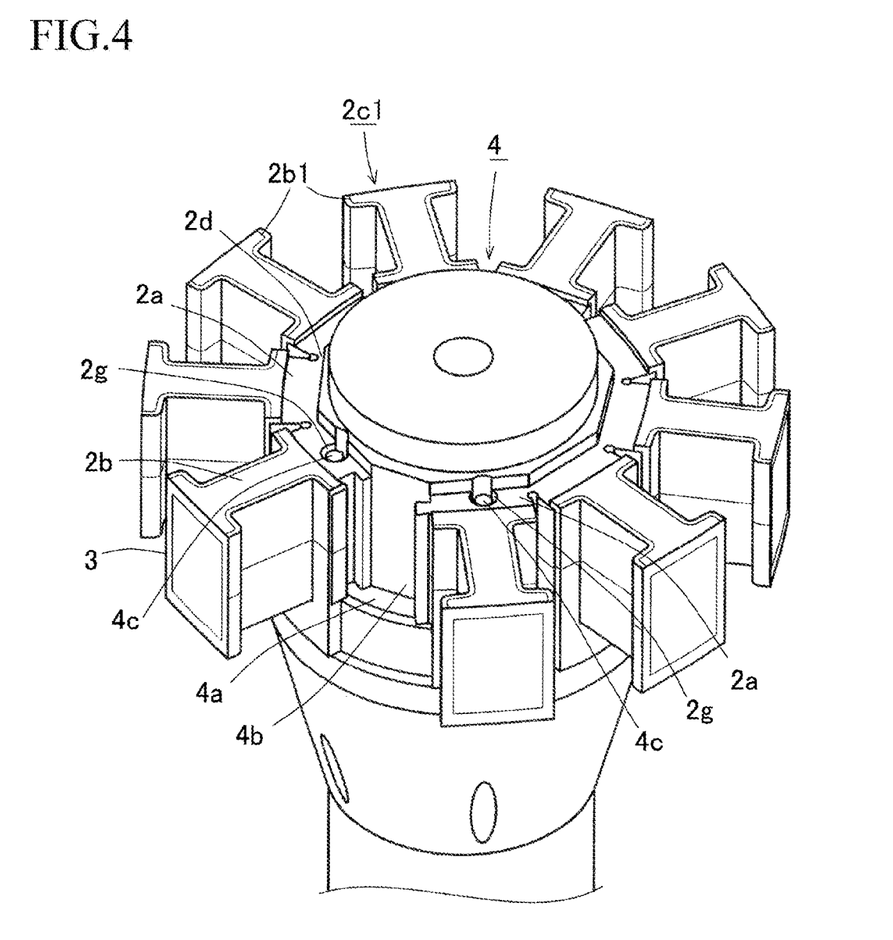
FIG. 4 is a perspective explanatory view showing a state where the segment core is fitted to the winding jig of FIG. 3.

As shown in FIG. 4, each of the segment cores 2c1 to 2c4 is placed on the stepped part 4a of the winding jig 4 by fitting the positioning pins 4c to the groove holes 2g provided in the yoke parts 2a positioned at both end parts in the longitudinal direction in the arc attitude with the wide gaps between the teeth edges 2b1 of the pole teeth 2b extended outward in the radial direction through the thin wall parts 2d where the yoke parts 2a are connected to one another. Accordingly, the yoke parts 2a are prevented from rotating along the guide surface 4b to be positioned and fixed. In this case, coil winding with a high space factor can be performed with respect to the segment cores 2c1 to 2c4 in the arc attitude with the wide gaps between the teeth edges 2b1 of the respective pole teeth 2b by using a not-shown winding machine.

The winding machine performs winding while maintaining a fixed tension at the time of winding the coil 2h around outer peripheries of the insulated bobbins 3 covering around the pole teeth 2b. As a positioning structure of the segment cores 2c1 to 2c4 in the winding jig 4, a method of pressing the segment cores 2c1 to 2c4 from upper and lower directions may be considered. However, deformation caused by extension of the arc-shaped segment core (to be an arc shape with a small curvature) or rotation of the segment core may occur due to the tension generated at the time of winding work in the above method; therefore, it is difficult to stably place the segment core, which makes it difficult to perform automatic winding. In this point, the segment cores 2c1 to 2c4 are not deformed from the arc shape and are not rotated by the winding work in the positioning structure using the positioning pins 4c; therefore, it is possible to place the segment cores stably and to realize the automatic winding work.

Figure 5:
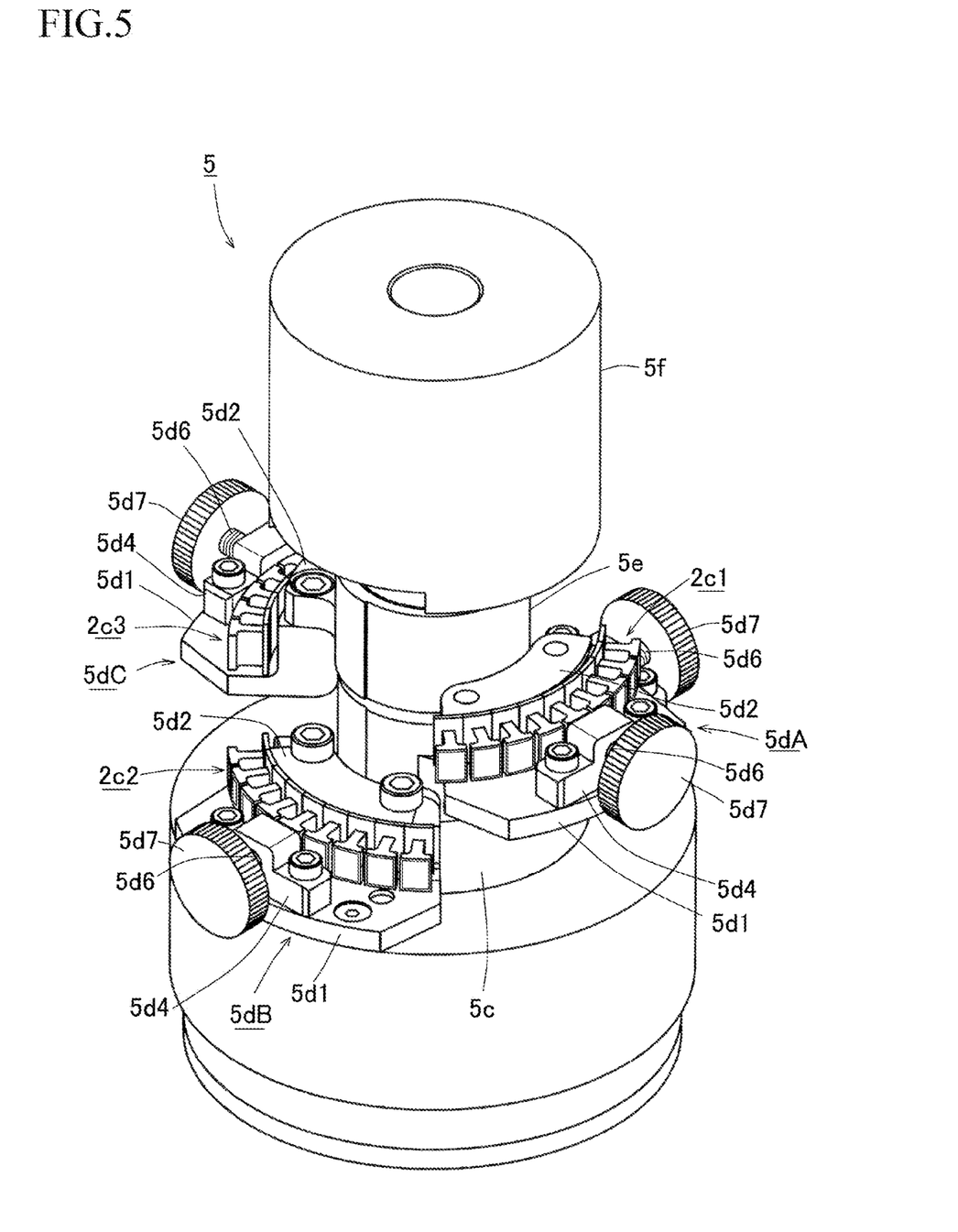
FIG. 5 is a perspective view of an annular fastening jig.

The segment cores 2c1 to 2c4 in which the coil has been wound are expanded in an arc shape having the curvature of the stator core 2c through the thin wall parts 2d, which are assembled in an annular shape by using the annular fastening jig 5 shown in FIG. 5. The coil 2h is not shown in FIG. 5 for explanation.

Figure 8:
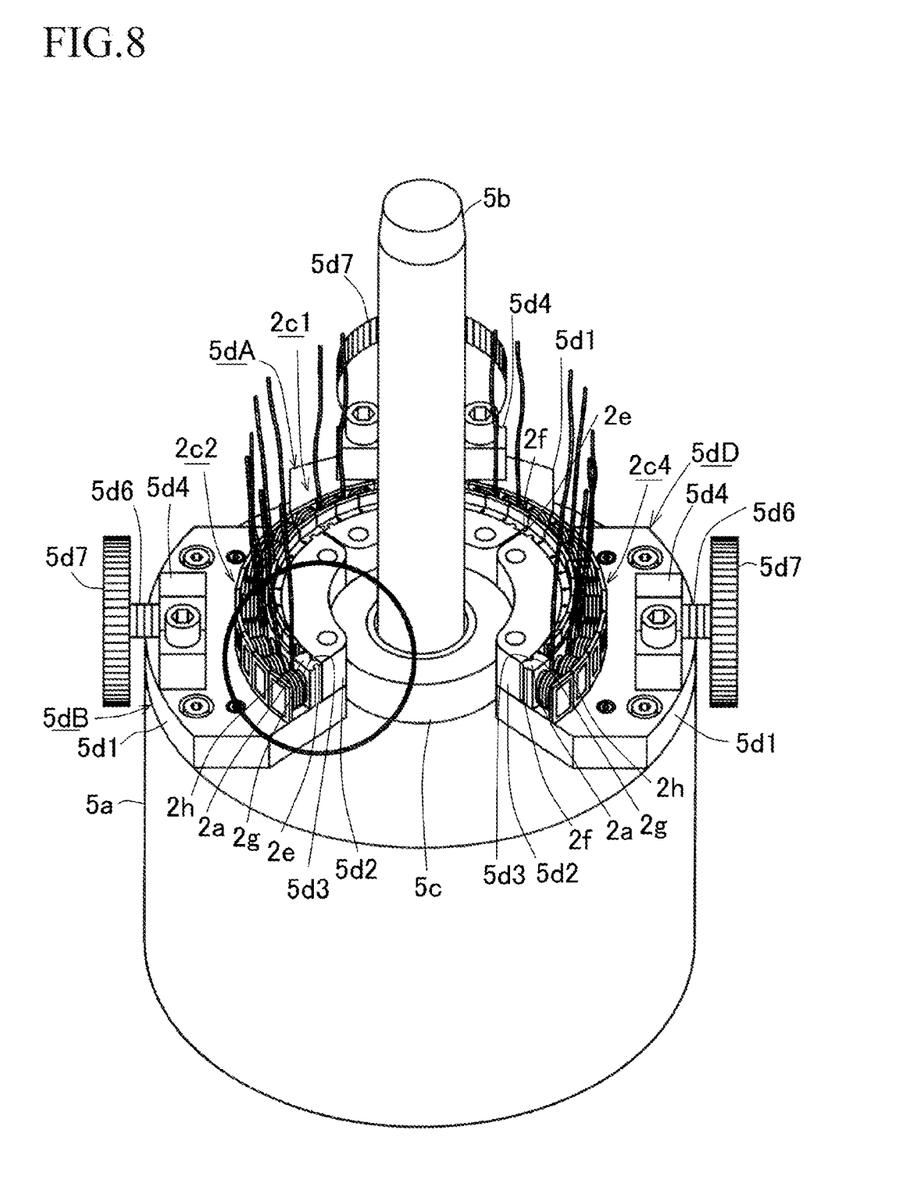
FIG. 8 is an explanatory view showing an annular fastening process of the segment cores with respect to the annular fastening jig.

The annular fastening jig 5 is provided with a guide shaft 5b at a central part of a disc-shaped base 5a as shown in FIG. 8. A guide ring 5c is provided on the base 5a side of the guide shaft 5b. A plurality of segment jigs 5dA to 5dD on which the segment cores 2c1 to 2c4 are mounted are assembled around the guide ring 5c. The segment jigs 5dA to 5dD are used at the time of positioning the respective segment cores 2c1 to 2c4 and connecting them in an annular shape. The segment core 2c1 is positioned in the segment jig 5dA, the segment core 2c2 is positioned in the segment jig 5dB, the segment core 2c3 is positioned in the segment jig 5dC, and the segment core 2c4 is positioned in the segment jig 5dD.

In FIG. 5, the segment jig 5dB and the segment jig 5dD are previously fixed around the guide ring 5c at opposite positions on the base 5a. The segment jigs 5dA and the 5dC are inserted between the segment jigs 5dB and 5dD to be assembled.

Figure 6:
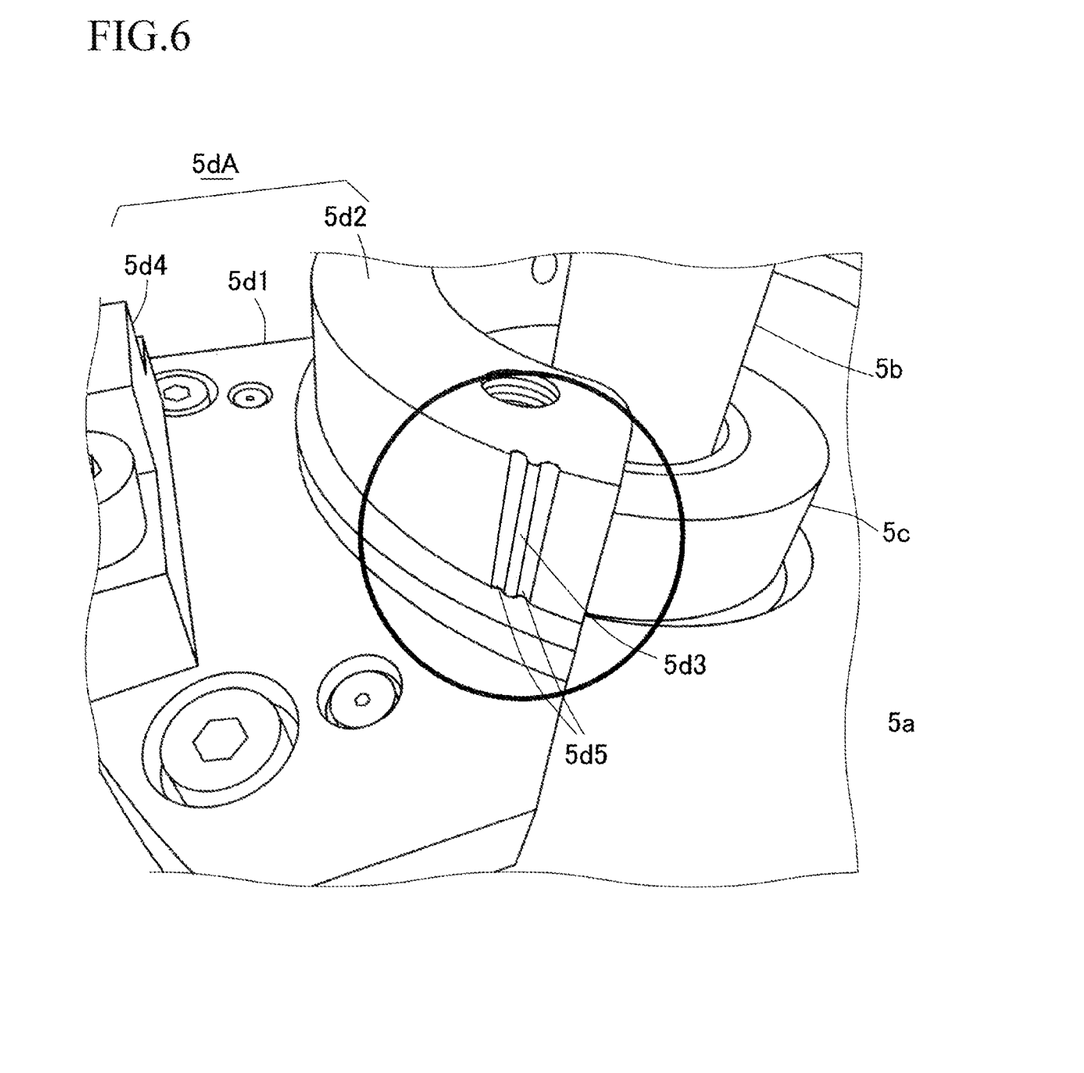
FIG. 6 is an enlarged view of part of a segment jig.

As shown in FIG. 6, a guide block 5d2 and a nut block 5d4 are screw-fixed to a base plate 5d1 from an inner side in the radial direction in each of the segment jigs 5dA to 5dD. In FIG. 6, only the segment jig 5dA is cited as an example.

The arc-shaped guide block 5d2 abutting on an outer peripheral surface of the guide ring 5c is fixed to the inner side of the base plate 5d1 in the radial direction. On an outer peripheral surface of the guide block 5d2, the positioning ridges 5d3 for performing positioning in the circumferential direction in the arc attitude by being fitted to the groove holes 2g provided in the yoke parts 2a at both end parts of each of the segment cores 2c1 to 2c4 are provided so as to be demarcated by a pair of concave grooves 5d5 on both sides (refer to a circular surrounded part in FIG. 6).

Moreover, the nut block 5d4 is fixed to an outer peripheral side of the guide block 5d2 on the base plate 5d1. A screw shaft 5d6 is screw-fitted to the nut block 5d4 from the outer side toward the inner side in the radial direction as shown in FIG. 8. The screw shaft 5d6 is configured to press or separate a magnetic flux action surface of the pole teeth 2b at the central part of each of the segment cores 2c1 to 2c4 in the circumferential direction by tuning a knob 5d7. Each of the segment cores 2c1 to 2c4 positioned along the outer peripheral surface of the guide block 5d2 on the base plate 5d1 is positioned in the radial direction by allowing the screw shaft 5d6 to abut on the pole teeth 2b toward the inner side in the radial direction.

As shown in FIG. 5, each of the segment cores 2c1 to 2c4 is prevented from rotating on the base plate 5d1 by fitting the groove holes 2g respectively formed in the yoke parts 2a at both end parts in the longitudinal direction in the positioning ridges 5d3 (refer to a circular surrounded part of FIG. 8). Each of the segment cores 2c1 to 2c4 is positioned in the radial direction by pressing the screw shaft 5d6 onto the pole teeth 2b on the inner side in the radial direction by tuning the knob 5d7.

As described above, the positioning pins 4c are fitted to the groove holes 2g provided in the yoke parts 2a positioned at both end parts of each of the segment cores 2c1 to 2c4 in the longitudinal direction to prevent rotation with respect to the winding machine 4, which makes the arc attitude of each of the segment cores 2c1 to 2c4 stable, and the automatic winding can be performed with the high space factor by using the winding machine while securing sufficient spaces between slots. When plural segment cores 2c1 to 2c4 in which the coil is wound are expanded and fastened in the annular shape, the segment cores 2c1 to 2c4 are positioned in the annular fastening jig 5 by using the groove holes 2g to be fastened in the annular shape, thereby assemble the stator core 2c with high roundness.

Here, an example of a method of manufacturing the stator 2 will be explained.

First, the plural segment cores 2c1 to 2c4 in which the yoke parts 2a provided with the pole teeth 2b are connected to one another through the thin wall parts 2d and peripheries of the pole teeth 2b are covered with the insulated bobbins 3 are prepared as shown in FIG. 2B. The segment cores 2c1 to 2c4 are obtained by dividing the annular stator core 2c shown in FIG. 2A into four by 90 degrees.

As shown in FIG. 4, each of the segment cores 2c1 to 2c4 is positioned with respect to the winding jig 4 in the stable arc attitude of each of the segment cores 2c1 to 2c4 in which the yoke parts 2a connected to one another through the thin wall parts 2d have a larger curvature than that of the stator core 2c by fitting the positioning pins 4c provided in the winding jig 4 to the groove holes 2g provided in the yoke parts 2a positioned at both end parts of each of the segment cores in the longitudinal direction.

Figure 9:
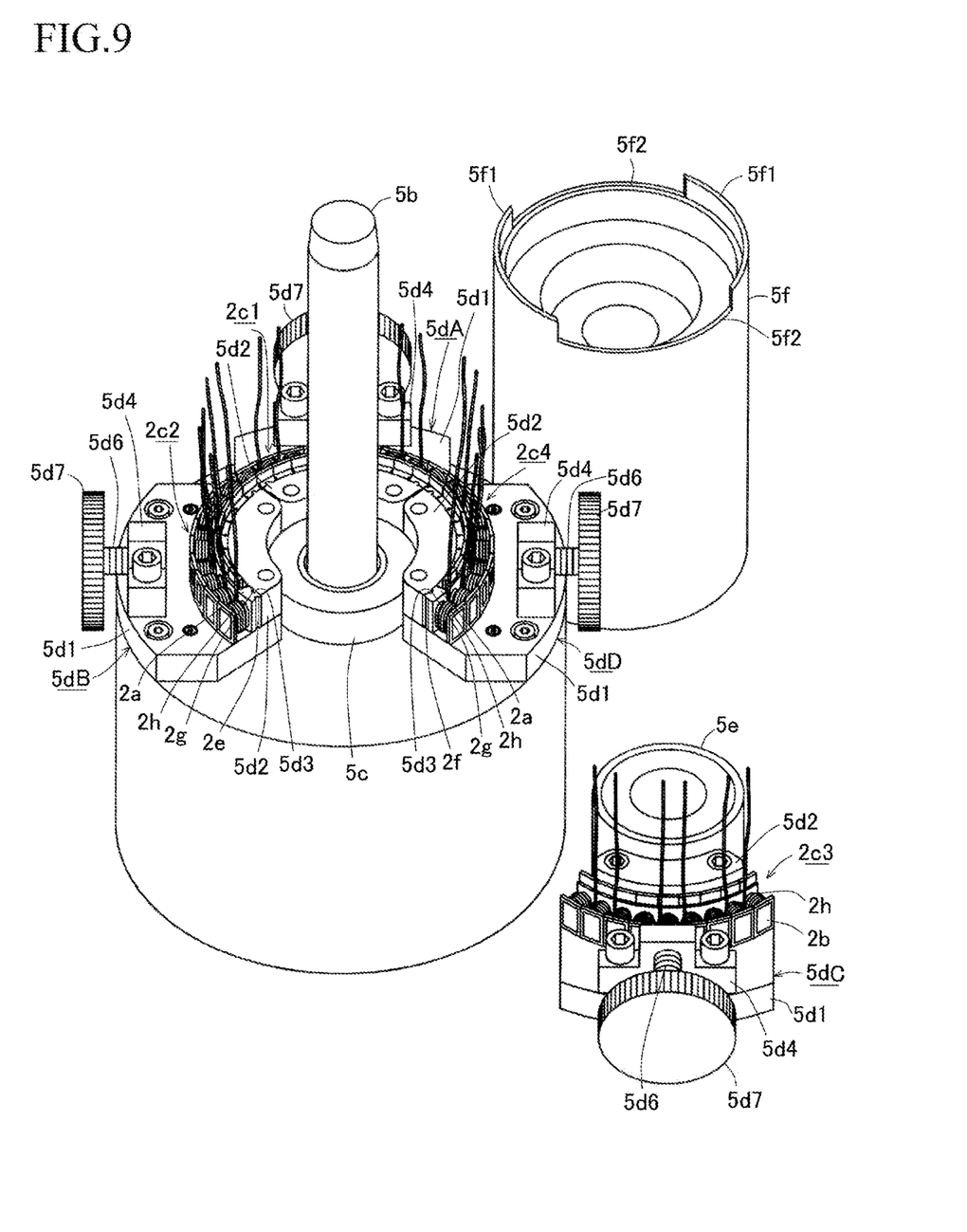
FIG. 9 is an explanatory view showing the annular fastening process of the segment cores with respect to the annular fastening jig continued from FIG. 8.

The coil 2h is wound around the pole teeth 2b extended to the outer side in the radial direction of each of the segment cores 2c1 to 2c4 positioned in the winding jib 4 through the insulated bobbins 3 by the not-shown winding machine. A state where the coil 2h is wound around the pole teeth 2b of the segment cores is shown in FIG. 9.

In the segment cores 2c1 to 2c4 in which the coil 2h is wound, the concave part 2e and the convex part 2f provided at ends of the yoke parts 2a positioned at both end parts of each of the segment cores 2c1 to 2c4 in the longitudinal direction are fitted to each other, thereby manufacturing the stator core 2c in which the yoke parts 2a are connected in the annular shape.

Figure 7:
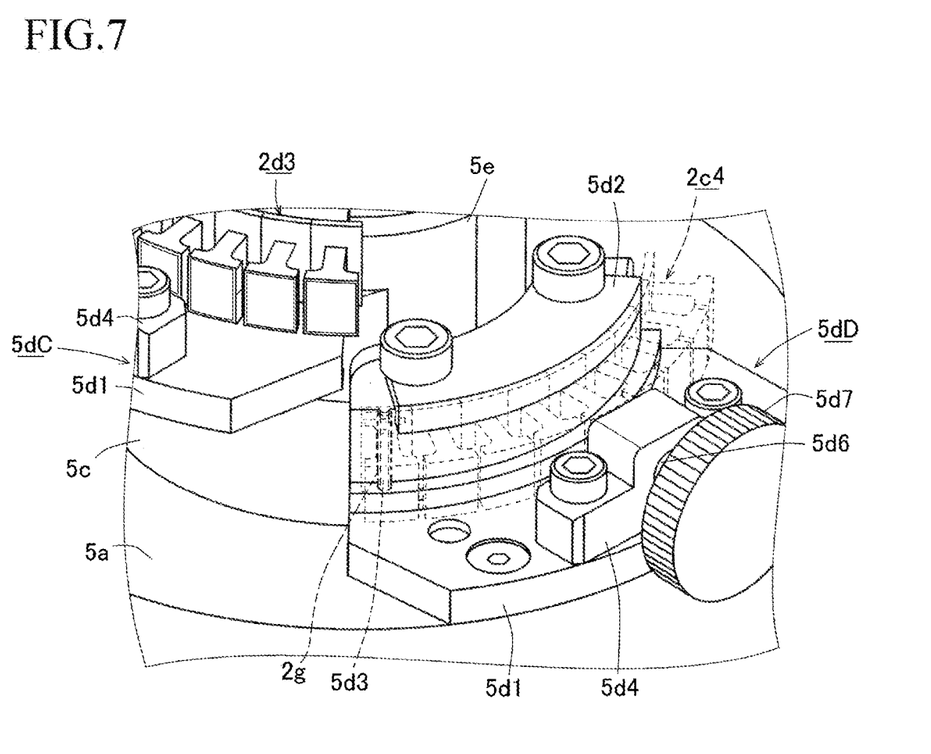
FIG. 7 is an explanatory view showing positioning of segment cores with respect to segment jigs.

Specifically, the positioning ridges 5d3 provided in the guide block 5d2 of each of the segment jigs 5dA to 5dD corresponding to the inner diameter of the stator core 2c are fitted to the groove holes 2g formed in the yoke parts 2a at both end parts in the longitudinal direction of each of the segment cores 2c1 to 2c4 in which the coil 2h is wound to thereby prevent rotation, and the screw shaft 5d6 is fastened by turning the knob 5d7 to thereby position each of the segment cores 2c1 to 2c4 in the radial direction as shown in FIG. 7. In FIG. 7, only the segment jig 5dD and the segment core 2c4 are shown, and the coil 2h is not shown for explanation.

As an example, the segment core 2c2 is positioned in the segment jig 5dB previously fixed on the base 5a, and the segment core 2c4 is positioned in the segment jig 5dD as shown in FIG. 8. The segment jig 5dA in which the segment core 2c1 is positioned and the segment jig 5dC in which the segment core 2c3 is positioned are arranged between the segment jigs 5dB and 5dD so as to form the annular shape around the guide ring 5c, and ends of the yoke parts 2a of adjacent segment cores 2c1, 2c2, and 2c4 are concavo-convex fitted. FIG. 9 shows a state where the segment core 2c1 is connected between the segment core 2c2 and the segment core 2c4. When the segment jig 5dA is arranged between the segment jig 5dB and the segment jig 5dD, the concave part 2e with the dovetail groove shape and the convex part 2f provided at ends of the yoke parts 2a at both end parts in the circumferential direction are fitted to each other to connect the segment cores in the arc shape.

Figure 10:
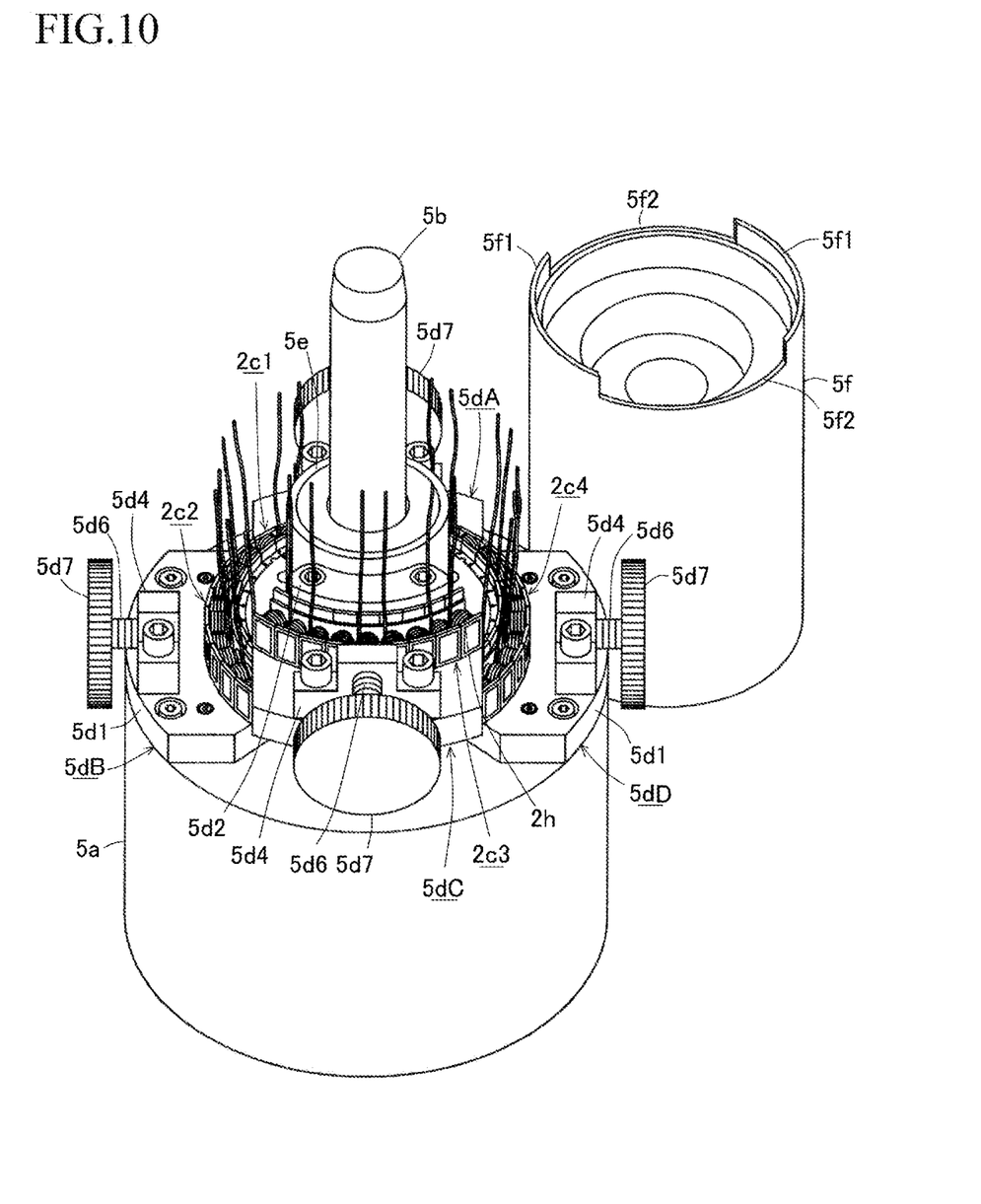
FIG. 10 is an explanatory view showing the annular fastening process of the segment cores with respect to the annular fastening jig continued from FIG. 9.

Then, the segment jig 5dA and the segment jig 5dC are arranged opposite to each other between the segment jig 5dB and the segment jig 5dD as shown in FIG. 10, and ends of the yoke parts 2a of adjacent segment cores 2c1, 2c2, 2c3, and 2c4 are concavo-convex fitted to thereby connect the yoke parts 2a of the segment cores 2c1 to 2c4 in the annular shape. Moreover, a guide ring 5e is fitted to the guide shaft 5b provided to stand on the base 5a, thereby positioning the guide blocks 5d2 therearound. Next, an annular weight 5f is fitted about the guide shaft 5b.

As shown in FIG. 10, pressing parts 5f1 respectively pressing upper end parts of the guide blocks 5d2 of the segment core 2c1 and the segment core 2c3 and relief parts 5f2 not contacting upper end parts of the guide blocks 5d2 of the segment core 2c2 and the segment core 2c4 are respectively formed at a lower end of the weight 5f.

Figure 11:
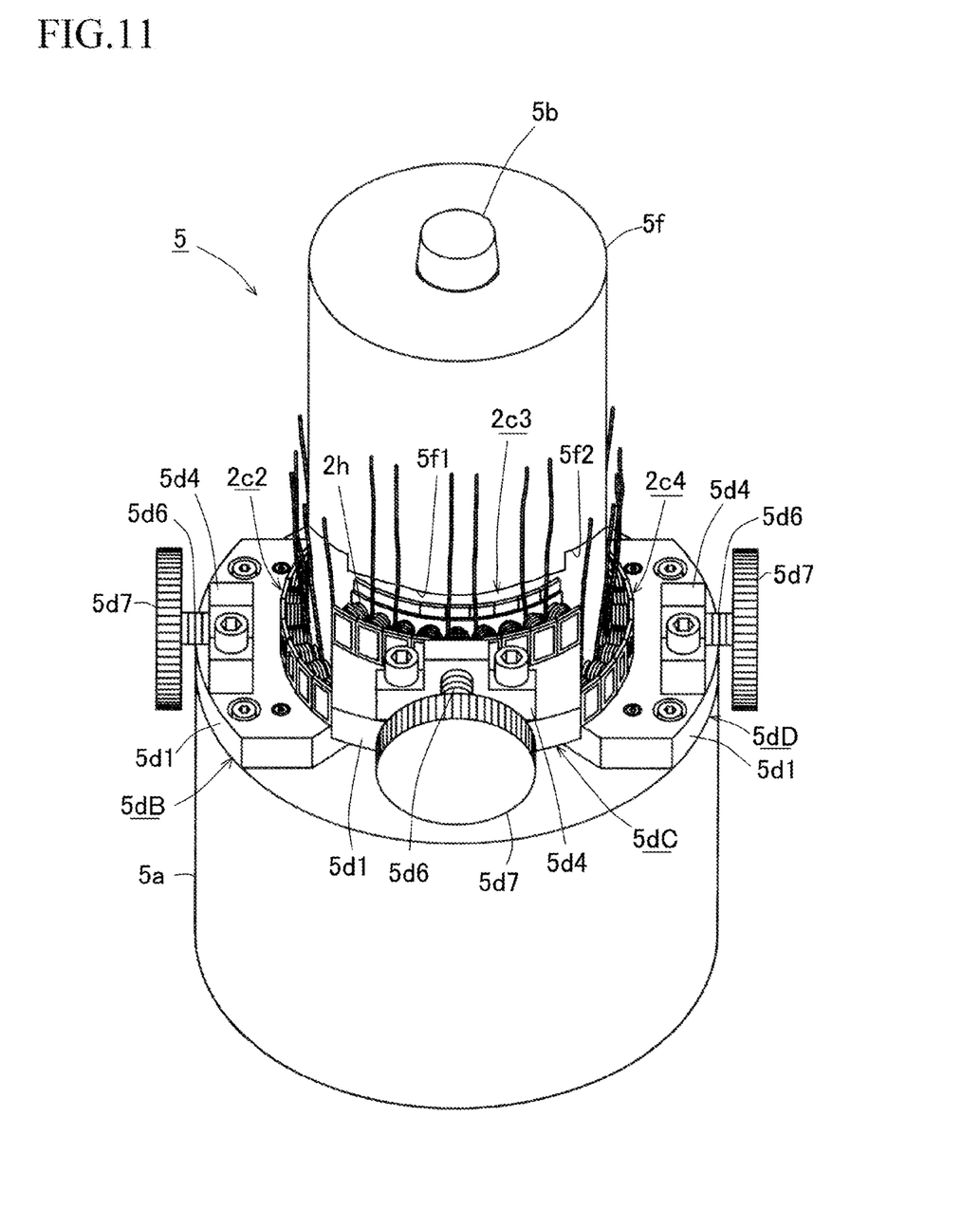
FIG. 11 is an explanatory view showing the annular fastening process of the segment cores with respect to the annular fastening jig continued from FIG. 10.
Figure 12:
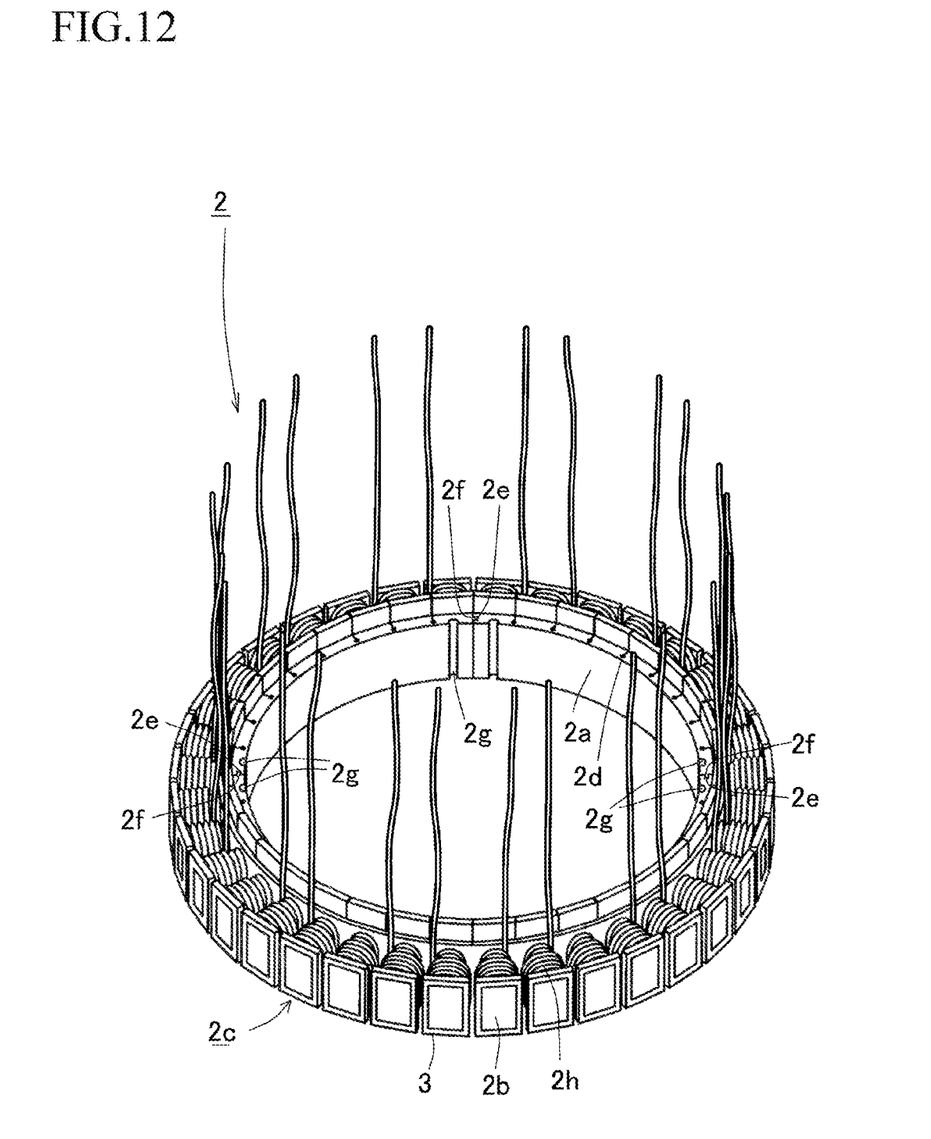
FIG. 12 is a perspective view of the stator core after the annular fastening.

As shown in FIG. 11, the segment core 2c3 positioned in the segment jig 5dC and the segment core 2c1 positioned in the segment jig 5dA which is not shown as it is positioned behind the weight 5f are inserted between the segment core 2c2 and the segment core 2c4, and the upper end parts of the guide blocks 5d2 of the segment cores 2c1 and 2c3 by the pressing parts 5f1 of the weight 5f, thereby fastening all segment cores 2c1 to 2c4 to the annular stator core 2c. The stator 2 fastened in the annular shape is shown in FIG. 12. As procedures of fastening the segment cores 2c1 to 2c4 in the annular shape, it is also preferable that the segment cores 2c1 and 2c3 are previously fixed at opposite positions on the base 5a, and then, any of the segment cores 2c2 and 2c4 is connected. Furthermore, it is also preferable that the segment core 2c3 and the segment core 2c4 are sequentially connected after the segment core 2c1 and the segment core 2c2 are connected.

According to the above, the coil 2h can be wound by the winding machine through the insulated bobbins 3 in the state where each of the segment cores 2c1 to 2c4 is positioned with respect to the winding jig 4 in the arc attitude in which the yoke parts 2a connected to one another through the thin wall parts 2d have the larger curvature than that of the stator core 2c and the gaps between the teeth edges 2b1 of respective pole teeth 2b are wide; therefore, coil winding work can be performed with the high space factor while saving labor.

The segment cores 2c1 to 2c4 in which the coil is wound are expanded and respectively positioned in the segment jigs 5d corresponding to the inner diameter of the stator core 2c, then, parts of segment jigs 5d are assembled on both sides of remaining segment jigs 5d to be the annular shape, thereby concavo-convex fitting ends of the segment cores 2c1 to 2c4 to one another and fastening the segment cores 2c1 to 2c4 in the annular shape. Consequently, the annular stator 2 in which the coil 2h is wound around the pole teeth 2b with the high space factor while maintaining roundness of the stator core 2c can be assembled.

According to the above, the positioning pins 4c provided in the winding jig 4 are fitted to the groove holes 2g provided in the yoke parts 2a positioned at both end parts of each of the segment cores 2c1 to 2c4 in the longitudinal direction, thereby making the arc attitude of the segment cores 2c1 to 2c4 stable even when affected by tension caused at the coil winding work, and thereby winding the coil 2h through the insulated bobbins 3 by using the winding machine in the state where each of the segment cores 2c1 to 2c4 is positioned in the winding jig 4 in the arc attitude in which the yoke parts 2a connected to one another through the thin wall parts 2d have the larger curvature than that of the stator core 2c, as a result, the coil winding work can be performed with the high space factor while saving labor.

The segment cores 2c1 to 2c4 in which the coil is wound are connected in the annular shape by fitting the concave part 2e and the convex part 2f to each other, which are provided at ends of the yoke parts 2a positioned at both end parts of each segment core in the longitudinal direction, thereby assembling the stator 2 while maintaining roundness of the stator core 2c.

The segment cores 2c1 to 2c4 obtained by dividing the stator core 2c into four by 90 degrees in the circumferential direction are used in the above embodiment; however, the present invention is not limited to this. It is also preferable to use segment cores obtained by dividing the stator core 2c into three by 120 degrees or other divided segment cores.

The stator according to the embodiment is suitably used for the stator of the outer rotor type motor, particularly, a stator of a motor with a large outer diameter and with a large number of pole teeth; however, the stator may also be applied to an inner rotor type motor.

What is claimed is:

1. A stator configured by segment cores obtained by dividing an annular stator core in which yoke parts provided with pole teeth are connected to one another through thin wall parts into plural segments being assembled in an annular shape, wherein groove holes capable of positioning each of the segment cores, which are divided into a plurality and formed in an arc shape with a prescribed larger curvature than that of the annular stator core, with respect to a winding jig in an arc attitude are respectively formed in the yoke parts positioned at both end parts of each of the divided segment cores in a longitudinal direction, and wherein the divided segment cores are expanded to make mutual curvatures have a reduced size and fastened to the annular stator core.

2. The stator according to claim 1, wherein a concave part and a convex part for fastening the segment cores to one another in the annular shape are provided at ends of the yoke part positioned at both end parts of each of the segment cores in the longitudinal direction.

3. The stator according to claim 2, wherein the concave part is formed in a dovetail groove shape, inclination angles of groove side walls with respect to a groove bottom part are formed so that the inner diameter side is equal to or greater than the outer diameter side, and inclination angles of both side surfaces with respect to an end surface of the convex part to be fitted to the concave part are formed so that the inner diameter side is equal to or greater than the outer diameter side.

4. The stator according to claim 1, wherein the groove hole is formed on a surface where a center line in a longitudinal direction of the pole tooth extended from the yoke part crosses the yoke part.

5. The stator according to claim 1, wherein the groove hole is a round groove hole to which a columnar positioning pin is capable of being fitted.

6. An outer rotor type motor comprising:

the stator according to claim 1.

7. A method of manufacturing a stator comprising the steps of:

preparing a plurality of arc-shaped segment cores which are formed in an arc shape with a prescribed larger curvature than that of the annular stator core and in which yoke parts provided with pole teeth are connected to one another through thin wall parts and peripheries of the pole teeth are covered with insulated bobbins;

positioning each of the segment cores with respect to a winding jig in an arc attitude having a larger curvature than that of a stator core with larger gaps between teeth edges of respective pole teeth by fitting positioning pins provided in the winging jig to groove holes provided in the yoke parts positioned at both end parts of each of the segment cores in a longitudinal direction;

winding a coil around the pole teeth extended in a radial direction of each of the segment cores positioned in the winding jig through the insulated bobbins by using a winding machine; and expanding the segment cores in which the coil is wound to make their curvatures having a reduced size, positioning the segment cores in an annular fastening jig by using the groove holes provided in the yoke parts at their both longitudinal end parts and annularly fastening the segment cores.

8. The method of manufacturing the stator according to claim 7, further comprising the steps of:

fitting the groove holes at both end parts in the longitudinal direction of the segment cores in which the coil is wound in positioning ridges provided in segment jigs corresponding to an inner diameter of a stator core to prevent rotation; and combining the plural segment jigs positioned in a radial direction with one another in an annular shape and concavo-convex fitting ends of respective segment cores to both sides of the other segment cores to be fastened in the annular shape.

* * * * *